US008924427B2

(12) United States Patent
Amsterdam et al.

(10) Patent No.: US 8,924,427 B2
(45) Date of Patent: Dec. 30, 2014

(54) NOTIFICATION OF A PENDING DIGITAL VIDEO RECORDER DELETION EVENT

(71) Applicant: International Business Machines Corporation, Armonk, NY (US)

(72) Inventors: Jeffrey D. Amsterdam, Roswell, GA (US); Kulvir S. Bhogal, Pflugerville, TX (US); Gregory J. Boss, American Fork, UT (US); Rick A. Hamilton, II, Charlottesville, VA (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/888,735

(22) Filed: May 7, 2013

(65) Prior Publication Data

US 2013/0243400 A1 Sep. 19, 2013

Related U.S. Application Data

(63) Continuation of application No. 12/244,450, filed on Oct. 2, 2008, now Pat. No. 8,458,220.

(51) Int. Cl.
*G06F 7/00* (2006.01)
*G06F 17/30* (2006.01)
*H04N 5/76* (2006.01)
*H04N 9/79* (2006.01)
*H04N 5/782* (2006.01)

(52) U.S. Cl.
CPC ............. *H04N 9/79* (2013.01); *H04N 5/782* (2013.01); *H04N 5/76* (2013.01)
USPC ........................................................ 707/793

(58) Field of Classification Search
CPC ................ G06F 17/30002; G06F 17/30017; G06F 17/30067; G06F 17/30115; G06F 17/30117

USPC ........................................................... 707/793
See application file for complete search history.

(56) References Cited

U.S. PATENT DOCUMENTS 7,245,819 B1 * 7/2007 Sanders ......................... 386/241
7,486,875 B2 * 2/2009 Yamashita et al. ............. 386/291
(Continued)

FOREIGN PATENT DOCUMENTS

WO WO2007103154 A2 9/2007
WO WO 2007103154 A2 * 9/2007
(Continued)

OTHER PUBLICATIONS

Notice of Allowance (Mail Date Feb. 1, 2013) for U.S. Appl. No. 12/244,450, filed Oct. 2, 2008, First Named Inventor Bhogal et al., Conf # 2023.

(Continued)

*Primary Examiner* — Rehana Perveen
*Assistant Examiner* — Mark E Hershley
(74) *Attorney, Agent, or Firm* — Schmeiser, Olsen & Watts, LLP; Mark C. Vallone

(57) ABSTRACT

A method and system for early notification of a pending deletion event of deleting a recording. Notification options are configured. The notification options are maintained with respect to a user profile associated with a user. Configuring the notification options includes (i) configuring a notification interval between successive notifications of the pending deletion event of deleting the recording and (ii) configuring a notification of the pending deletion event of deleting the recording that was recorded by another user. The notification of the pending deletion event of deleting the recording is sent to the user via a notification method.

20 Claims, 5 Drawing Sheets

(56) References Cited

U.S. PATENT DOCUMENTS

| | | | |
|---|---|---|---|
| 7,624,412 B2* | 11/2009 | McEvilly et al. | 725/46 |
| 2002/0174430 A1* | 11/2002 | Ellis et al. | 725/46 |
| 2003/0093792 A1* | 5/2003 | Labeeb et al. | 725/46 |
| 2004/0105018 A1* | 6/2004 | Takahashi et al. | 348/231.2 |
| 2004/0111756 A1* | 6/2004 | Stuckman et al. | 725/142 |
| 2004/0146282 A1* | 7/2004 | Lee | 386/95 |
| 2004/0225718 A1* | 11/2004 | Heinzel et al. | 709/206 |
| 2005/0050578 A1* | 3/2005 | Ryal | 725/143 |
| 2005/0149571 A1* | 7/2005 | Jeon et al. | 707/104.1 |
| 2006/0020627 A1* | 1/2006 | Poslinski | 707/104.1 |
| 2006/0075429 A1* | 4/2006 | Istvan et al. | 725/39 |
| 2006/0212904 A1* | 9/2006 | Klarfeld et al. | 725/46 |
| 2007/0276733 A1* | 11/2007 | Geshwind et al. | 705/14 |
| 2007/0300262 A1* | 12/2007 | Kim | 725/58 |
| 2008/0066176 A1* | 3/2008 | Hamid | 726/21 |
| 2008/0162637 A1* | 7/2008 | Adamczyk et al. | 709/204 |
| 2008/0184297 A1* | 7/2008 | Ellis et al. | 725/39 |
| 2009/0142042 A1* | 6/2009 | Branam | 386/124 |
| 2009/0172728 A1* | 7/2009 | Shkedi et al. | 725/34 |
| 2009/0300697 A1* | 12/2009 | Hielscher et al. | 725/114 |
| 2010/0159889 A1* | 6/2010 | Sigmund et al. | 455/413 |

FOREIGN PATENT DOCUMENTS

| | | | |
|---|---|---|---|
| WO | WO2007103154 A3 | 9/2007 | |
| WO | WO2008055221 A2 | 5/2008 | |
| WO | WO 2008055221 A2 * | 5/2008 | H04N 5/781 |

OTHER PUBLICATIONS

Amendment (filed Oct. 30, 2012) for U.S. Appl. No. 12/244,450, filed Oct. 2, 2008, First Named Inventor Bhogal et al., Conf # 2023.

Office Action ( Mail Date Jul. 31, 2012) for U.S. Appl. No. 12/244,450, filed Oct. 2, 2008, First Named Inventor Bhogal et al., Conf # 2023.

RCE (filed Jan. 13, 2012) for U.S. Appl. No. 12/244,450, filed Oct. 2, 2008, First Named Inventor Bhogal et al., Conf # 2023.

Office Action (Mail Date Oct. 18, 2011) for U.S. Appl. No. 12/244,450, filed Oct. 2, 2008, First Named Inventor Bhogal et al., Conf # 2023.

Amendment (filed Jun. 29, 2011) for U.S. Appl. No. 12/244,450, filed Oct. 2, 2008, First Named Inventor Bhogal et al., Conf # 2023.

Office Action (Mail Date Mar. 29, 2011) for U.S. Appl. No. 12/244,450, filed Oct. 2, 2008, First Named Inventor Bhogal et al., Conf # 2023.

* cited by examiner

NOTIFICATION OF A PENDING DIGITAL VIDEO RECORDER DELETION EVENT

This application is a continuation application claiming priority to Ser. No. 12/244,450, filed Oct. 2, 2008, now U.S. Pat. No. 8,458,220, issued Jun. 4, 2013.

TECHNICAL FIELD

Embodiments are generally related to digital play back devices systems. Embodiments are also related to DVR (Digital Video Recorder) methods and systems.

BACKGROUND OF THE INVENTION

Digital playback devices and/or systems such as, for example, a DVR (Digital Video Recorder), have become increasingly popular with consumers. A DVR can be utilized to record video in a digital format to a disk drive or a storage medium. The term "DVR" also includes components such as stand-alone set-top boxes and software for personal computers, which enable video capture and play back to and from a disk or other data storage device. A DVR provides several enhancements to similar devices, such as a VCR (Video Cassette Recorder), which includes convenient "time shifting". Time shifting involves recording programming to a storage medium to be viewed or listened to at a time that is more convenient to the consumer. Additionally, a DVR enables "trick modes" such as pausing live TV, instant replay of interesting scenes, chasing playback and skipping of advertising. Most DVR devices utilize the MPEG (Moving Picture Experts Group) format for encoding analog video signals.

The majority of DVR systems can be accessed by multiple users in a shared user environment (e.g., family members). The recorded programs or files on the DVR must be eventually deleted to make room for new programming. Unfortunately, such deletion in a shared user environment sometimes leads to a recording desired to be retained by one user deleted by another user of the same DVR system. Further, discussion and agreement between users is typically required in order to determine which recordings can be deleted and which recordings should be retained. Current DVR systems typically delete a recording as soon as a user selects the recording for deletion. However, if a user chooses to delete a program recorded by another user, that user will not realize that the recording has been deleted until searching for it through the DVR menu system and will be unable to locate that specific recording. The user also has no recourse to prevent such deletion. Furthermore, it is common for the DVR to automatically remove recordings when space is required for new recordings. Unless a DVR user has explicitly requested a recording to be retained, recordings of interest to the user are often deleted (i.e., contrary to the user's desires).

Prior art systems typically require configuring in advance the number of users to complete viewing of a recording before it is scheduled for deletion. Such systems also require the original user to grant access to other users and involve a complicated ratings process to determine which recordings can be deleted. The configuration, access permissions, and deletion scheduling associated with such prior art systems are complicated; hence, such systems may not be easily implemented in the context of a home DVR environment. Also, such systems may allow situations where the DVR is constantly running low on disk space as users are preventing recordings from being deleted. The deletion events can be displayed in a GUI interface of the DVR. Such systems, however, can be restricted to the on-screen display and users which are not viewing the on-screen display may miss such events.

Based on the foregoing, it is believed that a need exists for an improved system and/or method for early notification of a pending DVR deletion event with respect to the DVR. A need also exists for a method for providing easy deletion and informing users in disparate locations of such actions as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved digital play back system.

It is another aspect of the present invention to provide for a method, system and computer-usable medium for early notification of a pending DVR deletion event with respect to the DVR.

It is a further aspect of the present invention to provide for an improved system and method for providing easy deletion and informing users in disparate locations of such deletion actions.

The aforementioned aspects and other objectives and advantages can now be achieved as described herein. A system and method for early notification of a pending DVR deletion event with respect to a DVR is disclosed. Programs associated with the DVR can be scheduled for deletion in advance by a DVR interface manually and/or automatically. A user can be notified of a deletion event through a remote delivery after a DVR recognizes that a recording is about to be deleted by analyzing scheduled recordings and hard drive space. The notification of the deletion event can be enabled by configuring a number of notification options maintained for each user profile by the DVR at a predefined time. The deletion event can be modified through the remote delivery, which allows a user to send information back to the DVR after a deletion notification is received. The deleted files can be moved to a deleted programs folder from which the program can be recovered and/or the recording can be irrevocably removed after a time period.

Additionally, an option can be provided to modify the deletion event through the remote interface associated with the DVR when a user receives a notification message. The deletion event for the recording can also be extended by a certain time in order to allow users to view a program which has not yet been viewed. The notification options can be set within the DVR interface and/or through any other means enabled by the DVR, such as a web interface. The recording can be removed at the expiration of the deletion event if no modifications are made to the deletion event before the scheduled time is reached. The programs can be deleted normally and the DVR sends notifications to the requested users that schedule the program for deletion in the background. A notification can also be transmitted to the user when system determined deletion of user-initiated recordings is pending. Furthermore, the proposed invention enables a user to prevent a deletion of a wanted program due to retention rules and disk space constraints.

BRIEF DESCRIPTION OF THE DRAWINGS

The accompanying figures, in which like reference numerals refer to identical or functionally-similar elements throughout the separate views and which are incorporated in and form a part of the specification, further illustrates embodiments of the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
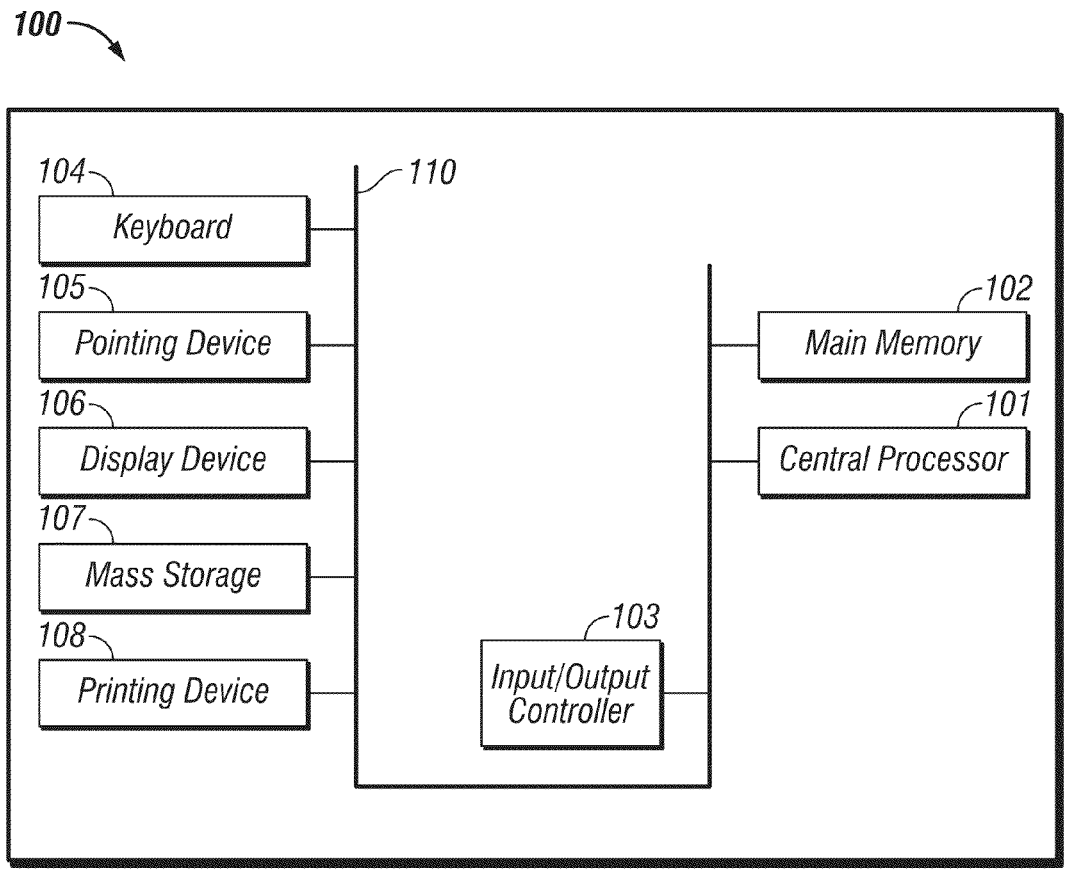
FIG. 1 illustrates a schematic view of one example of a computer system in which the present invention may be embodied.
Figure 2:
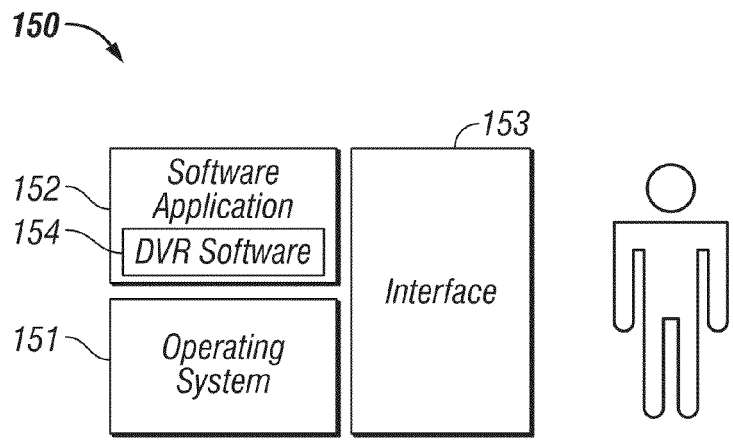
FIG. 2 illustrates a schematic view of a software system including an operating system, application software, and a user interface for carrying out the present invention.
Figure 3:
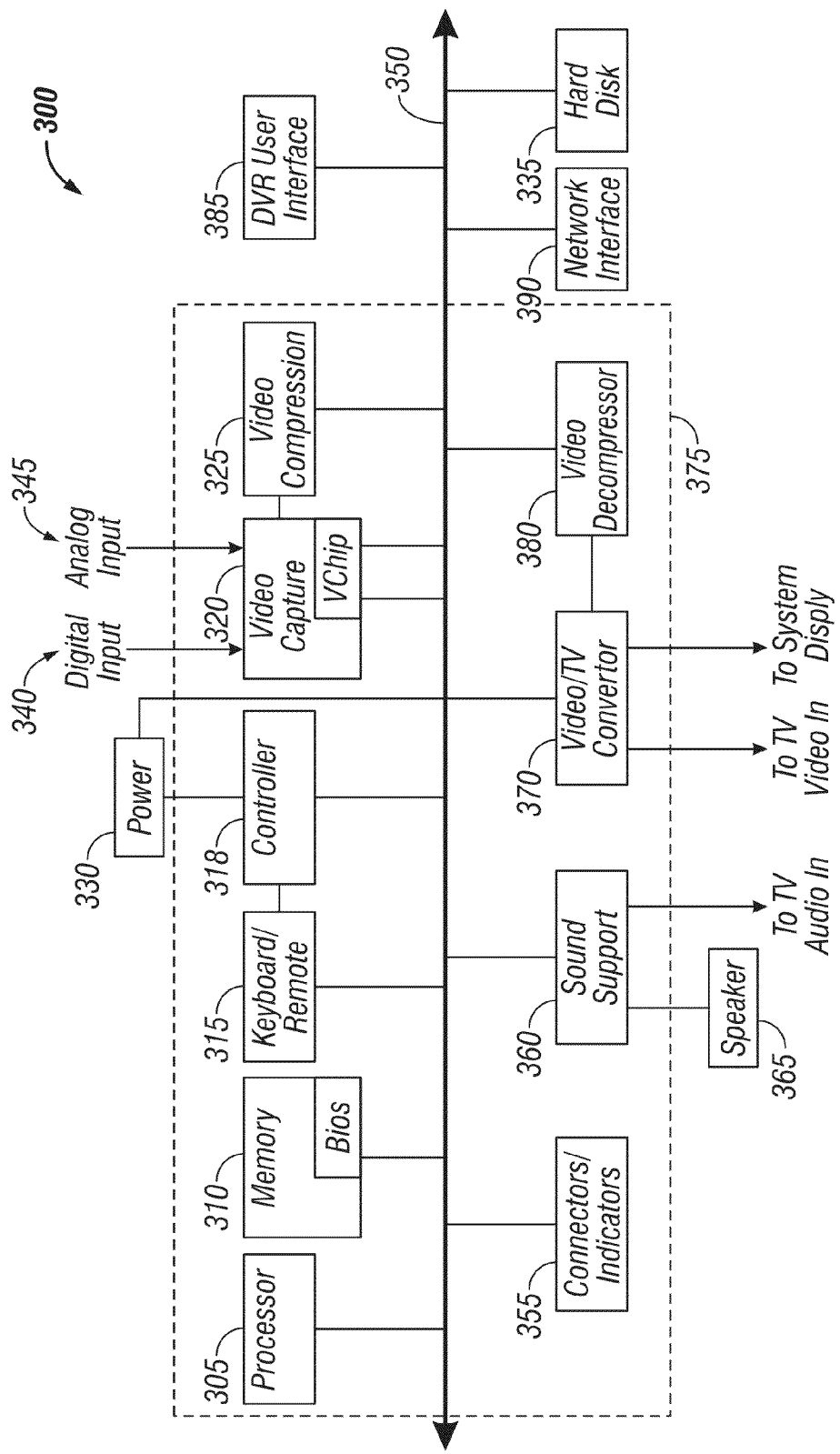
FIG. 3 illustrates a block diagram of a digital video recorder (DVR), which can be implemented in accordance with a preferred embodiment.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 illustrates that the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). As illustrated, the various components of the data-processing apparatus 100 communicate through a system bus 110 or similar architecture.

FIG. 2 illustrates a computer software system 150 provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153 is preferably a graphical user interface (GUI). In one possible embodiment, operating system 151 and interface 153 can be implemented in the context of a "Windows" system. Application module 152, on the other hand, can include instructions, such as the various operations described herein with respect to the various components and modules described herein, such as, for example, the method 400 depicted in FIG. 4. FIG. 1 is intended as an example and not as an architectural limitation for different embodiments of the present invention. The application module 152 can include digital video recording software such as, for example, DVR software 154, and complete monitoring control and exceptional access from the data-processing apparatus 100. The DVR application provides for hard disk recording, which is easy to search and play back previous recordings.

The following description is presented with respect to embodiments of the present invention, which can be embodied in the context of a data-processing system such as data-processing apparatus 100 and computer software system 150, as depicted respectively FIGS. 1-2. The present invention, however, is not limited to any particular application or any particular environment. Instead, those skilled in the art will find that the system and method of the present invention may be advantageously applied to a variety of system and application software, including database management systems, word processors, and the like.

FIG. 3 illustrates a block diagram of a digital video recorder (DVR) 300, which can be implemented in accordance with the preferred embodiment. It can be appreciated that DVR 300 represents merely one example of a digital playback device and that other types of digital playback devices may be utilized in place of DVR 300 to accomplish the embodiments disclosed herein.

The DVR 300 records video in a digital format to a disk drive or other memory medium within a device which includes stand-alone set-top boxes, portable media players (PMP) and software for computer 100 which enables video capture and playback to and from disk. The DVR 300 comprises a motherboard 375 containing at least one processor 305 and a memory 310 connected to a system bus 350. The memory 310 includes read only memory (ROM) containing a basic input/output services (BIOS) routine and may include cache memory and/or video RAM. A Video/TV converter 370 on the motherboard 375 can be connected to the system bus 350, which generates computer video signals for computer monitors, a composite television signal, and an S-Video signal. The functionality of the video/TV converter 370 can be provided utilizing commercially available video and converter chips. A video decompression circuitry 380 decompresses video data before it is sent to the video/TV converter 370. A keyboard/remote control interface unit 315 on the motherboard 375 receives keyboard codes through a controller 318, regardless of whether a wired keyboard/pointing device or an infrared keyboard/remote control is being employed.

The connectors/indicators 355 on the motherboard 375 provide connections and indications on DVR 300. The tuner/video capture circuitry 320 couples the DVR 300 to a source of programming. For example, the tuner/video capture circuitry 320 may receive television signals, which may be digital or analog. The tuner/video capture circuitry 320 may receive digital signals, such as digital television or high definition (HD) television, via a digital interface 340 or analog signals via an analog interface 345. These signals are well known to those skilled in the art for programming provided from over-air television, cable television, and satellite television.

The DVR 300 may be coupled via interfaces 345 or 340 to another device that serves as a program source, such as a digital video disk player, a videotape player, a compact disk player, an mp3 player, and the like. Additional known receivers, such as a receiver for satellite television, can also be implemented with the tuner/video capture circuitry 320, which separates the incoming television signals into audio signals and video signals. The video signals can be converted from analog to digital signals and then may be compressed via a video compression circuitry 325 which can be a moving pictures expert group (MPEG) compression circuitry. The tuner/video capture circuitry 320 may also include a V-chip or other type of screening circuitry.

The sound support 360 includes circuitry to convert audio signals from analog to digital and vice versa. The sound support 360 also includes circuitry to compress and decompress digital audio signals. Audio signals may be sent from the sound support 360 to a speaker 365 and/or the audio in connection of a television. External to the motherboard 375 in the depicted example are power supply 330, a hard disk 335 and a DVR interface 385. External power supply 330 is a conventional power supply except that it receives a control signal from a controller 318 which effects shut down of all power to the motherboard 375 and the hard drive 335. The power supply 330, in response to a signal from the controller 318, is capable of powering down and restarting the DVR 300. The hard disk 335 includes operating system and applications software for the DVR 300. Data, such as television program data, may also be stored on the hard disk 335.

A network interface 390 represent the hardware and software to allow DVR 300 to couple to a network, such as the telephone network, a local area network, a wide area network, or some other form of data network, such as the Internet. For example, the network interface 390 may be inserted into a slot mounted sideways on the motherboard 375. The network interface 390 may include other types of devices, such as an Ethernet interface, a wireless network interface, and the like. Accordingly, the DVR 300 may also receive programming from a source, such as a website, via the network interface 390. Controller 318 can be continuously powered and, when the DVR 300 is turned on, monitors the system for a periodic "ping" indicating that the DVR 300 is operating normally. In the event that the controller 318 does not receive a ping within a prescribed timeout period, the controller 318 removes power from the system and restarts the system, which may be necessary, for example, when the system experiences a general protection fault.

The DVR 300 is capable of self-recovery in some circumstances without involvement by a user. The controller 318 also receives and processes input from an infrared remote control, infrared keyboard, wired keyboard, or wired mouse. The DVR 300 may be configured to provide user-friendly methods for tracking the viewing status of users with respect to recorded programs. The DVR 300 can also be utilized to control the deletion activity of recorded programs. The DVR 300 may also be configured to track the viewing status of users and control the deletion of programs by other mechanisms. The DVR 300 or similar device may be configured to support multiple outputs to televisions, computer monitors, and the like. The structures of the various elements described above are known to those skilled in the art and cannot be discussed in the further detail.

Figure 5:
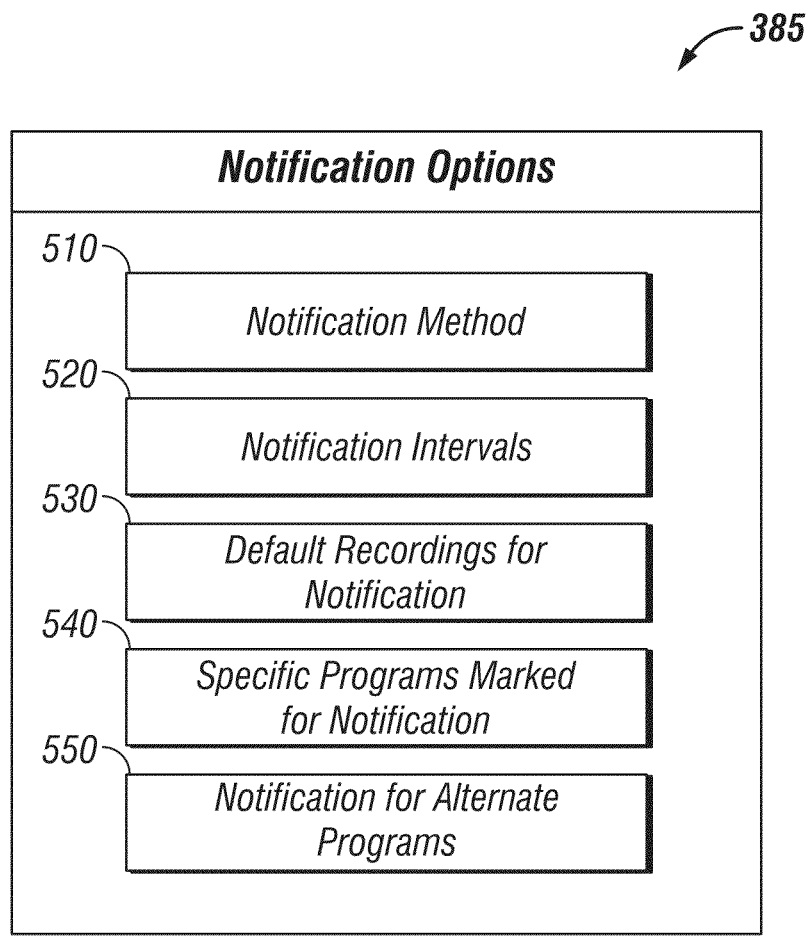
FIG. 5 illustrates a DVR GUI interface of the DVR depicting various notification options for each user profile, which can be implemented in accordance with a preferred embodiment.

The DVR 300 further includes a DVR interface 385 that allows recordings to be scheduled for deletion in advance. The scheduling can be automatic and/or manual. The deleted recordings can also be moved to a deleted programs folder from which the user can recover the program and after a time period the recording can be irrevocably removed. The user can also configure notification options associated with the DVR interface 385, as shown in FIG. 5. Such configuration can be maintained for each user profile by the DVR 300. The notification options can be set within the DVR interface 385 of the DVR 300 or through any other means enabled by the DVR 300, such as a web interface. The notification options can be checked at a predefined time before each deletion event in order to determine whether the notifications can be sent. The notification process can be performed by analyzing scheduled recordings and hard drive space, as well as checking which users may be interested in a program scheduled for deletion. Once the DVR 300 recognizes a recording is close to a deletion event, the DVR 300 checks which users should be notified about the deletion event and how to notify each user. The notification can be sent utilizing the DVR interface 385 which allows the user to send information back to the DVR 300 after a deletion notification is received.

Figure 4:
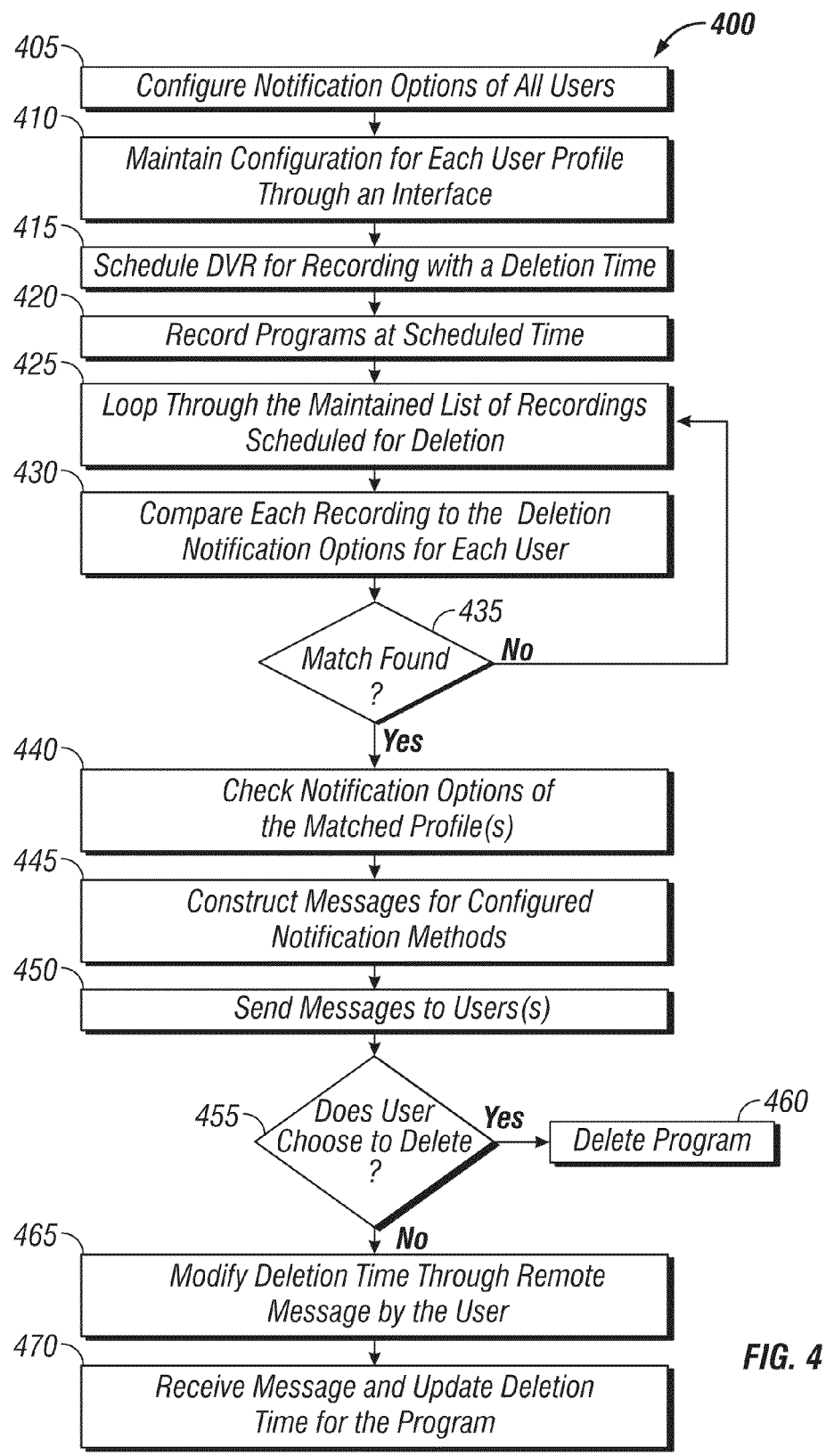
FIG. 4 illustrates a high level flow chart of operations illustrating logical operational steps of a method for early notification of a pending DVR deletion event, in accordance with a preferred embodiment.

FIG. 4 illustrates a high level flow chart of operations illustrating logical operational steps of a method 400 for early notification of a pending DVR deletion event, in accordance with a preferred embodiment. Note that the method 400 can be implemented in the context of a computer-useable medium that contains a program product. The notification options associated with all users can be configured, as depicted at block 405. The configuration for each user profile can be maintained through the DVR interface 385, as depicted at block 410.

FIG. 5 illustrates the DVR interface 385 of the DVR 300 depicting various notification options for each user profile, in accordance with a preferred embodiment. The notification options can be configured in order to enable a deletion event notification. The DVR 300 can maintain the configuration for each user profile. The notification options can be set within the DVR interface 385 of the DVR 300. The notification options can be checked at a predefined time before each deletion event to determine if notifications should be sent. The GUI interface 385 of the DVR 300 includes notification options such as notification method 510, notification intervals 520, default recordings for notification 530, specific programs marked for notification 540 and notification for alternate programs 550.

For example, the notification method 510 allows the user to select the preferred notification means such as, for example, electronic mail, SMS (Short Message Service), phone, instant message, pager etc. The notification intervals option 520 enables the user to select the duration between each notification before the deletion event. Next, through the options 530 and 540, the user can select default recordings and specific recordings associated with the DVR 300 for notification. The notification for alternate programs option 550 allows users to configure notification for programs recorded by other users. For example, if a user sees a program recorded by another user which they are interested in viewing, the user can mark the program so a notification event can be sent in case the program is scheduled for deletion. Such options can also be configured as an automatic event. For example, if a user begins watching a program, but does not finish it and that program is scheduled for deletion, the user can receive notification based upon that user's notification time parameters.

Thereafter, the DVR 300 can be scheduled for recording with a deletion time, as depicted at block 415. The proposed invention requires the DVR interface 385 that allows recordings to be scheduled for deletion in advance. The DVR 300 also allows for deletion events to be scheduled in addition to notification configuration. The scheduling can be automatic, for example, programs can be automatically scheduled for deletion two weeks after recording by default. The scheduling can be manual. For example, a user chooses a specific time for deletion, or a user simply deletes, at which point the DVR sets a scheduled deletion time in the future. The setting of a scheduled deletion also includes movement of a recording to a deleted programs folder from which the user can recover the program or after a time period the recording can be irrevocably removed.

The DVR 300 sets a deletion delay for a recorded program selected by a user to be deleted rather than simply deleting the recording. For example, if a user selects a recording for deletion, rather than deleting immediately, the DVR 300 marks the program for deletion in 12 hours. Also, specific times for deletion can be scheduled or a default deletion time for all new recordings can be provided. A recording can be marked as "save until space is needed" and the DVR 300 deletes the program once a new recording is scheduled and space for the new recording is needed. The DVR can send notifications with this type of deletion when new programs are scheduled and old programs are scheduled for deletion as a result.

The programs can be recorded at a scheduled time, as depicted at block 420. The DVR 300 can loop through the maintained list of recordings scheduled for deletion, as depicted at block 425. At a set interval, the DVR 300 may loop through the maintained list of recordings scheduled for deletion. Thereafter, each recording can be compared to the deletion notification options as shown in FIG. 5 for each user, as shown at block 430. A determination can be made whether a match is found, as illustrated at block 435. If the recording matches any of the user's default settings or specific settings for the program, notification options associated with the matched profile(s) can be checked, as depicted at block 440. Otherwise the process can be continued to block 425.

Next, as depicted at block 445, messages can be constructed for configured notification methods of the matched user(s). Each recording can be compared to the deletion notification options, as shown in FIG. 5 for each user. If the recording matches any of the user's default settings or specific settings for the program, the DVR starts the notification process. The notification process involves sending a message with relevant information about the recording to be deleted to a user by means of the user's preferred communication method. Additionally, an option can be provided to modify the deletion event through the remote interface 315 associated with the DVR 300 when a user receives a notification message. The remote interface 315 can receive instructions from any number of methods such as email, SMS, web form, phone, etc. The primary option for a user is to extend the deletion event for the recording by a certain time, which allows users to continue storing a program, which has not been viewed yet. If no modifications are made to the deletion event before the scheduled time is reached, the DVR 300 can remove the recording at the expiration of the deletion.

The notification of deletion events can be sent by analyzing scheduled recordings and hard drive space, as well as checking which users may be interested in a program scheduled for deletion. For example, once a DVR recognizes a recording is close to a deletion event, the DVR can begin the process of checking which users can be notified about the event and how each user can be notified. The notification can be through a remote delivery. The DVR 300 also provides the remote interface 315, which allows the user to send information back to the DVR 300 after a deletion notification is received. The constructed messages can then be sent to the matched user(s), as depicted at block 450. A determination can be made whether the user chose to delete the program, as illustrated at block 455. If the user chooses to delete the program then the program can be deleted, as depicted at block 460. Otherwise, the deletion time can be modified through remote message by the user, as shown at block 465. The message can then be received by the DVR 300 and deletion time for the program can be updated, as depicted at block 470.

Figure 6:
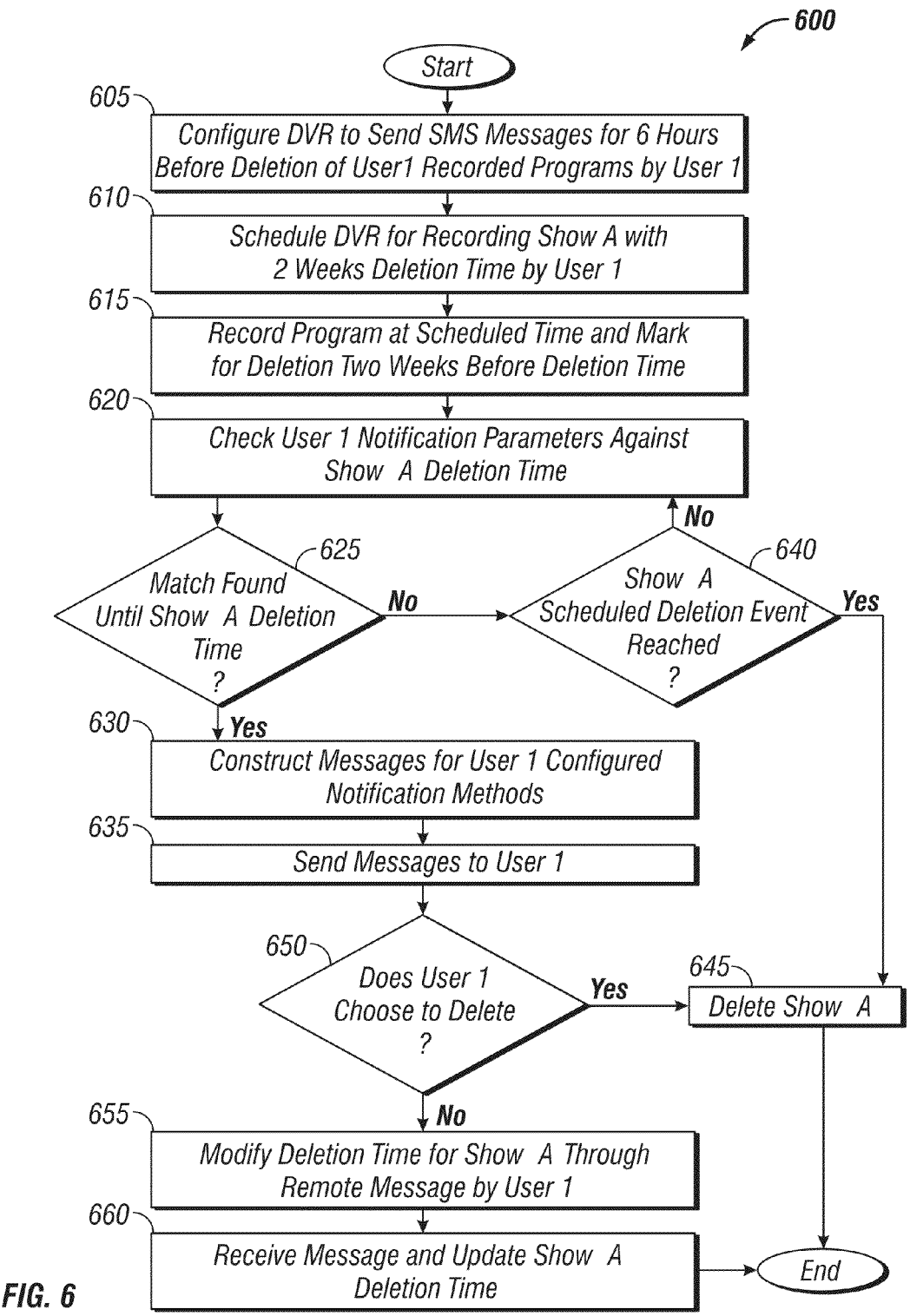
FIG. 6 illustrates an exemplary flow chart of operations illustrating logical operational steps of a method for early notification of a pending DVR deletion event, which can be implemented in accordance with a preferred embodiment.

FIG. 6 illustrates an exemplary flow chart of operations illustrating logical operational steps of a method 600 for early notification of a pending DVR deletion event, which can be implemented in accordance with a preferred embodiment. For example, user 1 has configured notification options as shown in FIG. 5 with a preferred notification method to send deletion notification associated with user 1-recorded programs through SMS. The DVR 300 can be configured to send messages for 6 hours before deletion of user 1's recorded programs, as depicted at block 605. Thereafter, the DVR 300 can be scheduled through the DVR interface 385 for recording show "A" with a two week deletion time by user 1, as illustrated at block 610. Thereafter, program can be recorded at scheduled time and can be marked for deletion two weeks before deletion time, as shown at block 615. Next, as illustrated at block 620, user 1 notification parameters can be checked against show "A" deletion time.

The DVR 300 loops through the list of recorded shows on a set interval and checks show "A" against the user configuration options. A determination can be made whether a match can be found until show "A" deletion time, as shown at block 625. If a match is found, messages for user 1 configured notification methods can be constructed by the DVR 300, as depicted at block 630 and the constructed messages can be sent to user 1, as shown at block 635. Otherwise, a determination can be made whether a scheduled deletion event has been reached for show "A", as depicted at block 640. If scheduled deletion event is reached for show "A", show "A" can be deleted, as illustrated at block 645. Otherwise, the process can be continued to block 620.

Next, as depicted at block 650, a determination can be made whether user 1 choose to delete show "A". If user 1 chooses to delete, then show "A" can be deleted, as shown at block 645. Otherwise, deletion time can be modified for show "A" through remote message by user 1, as depicted at block 655. The message can be received by the DVR 300 and deletion time can be updated for show "A", as shown at block 660. The method 600 prevents other users from deleting recorded programs in order to keep DVR hard disk 335 from filling up with unneeded or unwatched recordings, preventing all users in the multi-user environment from utilizing the DVR 300. The users can delete programs normally, while the DVR 300 sends notifications to users who have requested the program and schedules the program for deletion in the background. Furthermore, the proposed invention enables a user to prevent a deletion of a wanted program due to retention rules and disk space constraints.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for early notification of a pending deletion event of deleting a recording, said method comprising:
   a processor of a computer system configuring a plurality of notification options maintained with respect to a user profile associated with a first user, said configuring the plurality of notification options comprising (i) configuring a notification interval between successive notifications to the first user of the pending deletion event of deleting the recording and (ii) configuring a notification to the first user of the pending deletion event of deleting the recording that was recorded by another user and was not selected to be recorded by the first user; and
   said processor sending, to the first user via a notification method, the notification of the pending deletion event of deleting the recording.

2. The method of claim 1, said method further comprising:
   before said configuring the plurality of notification options, said processor scheduling the recording by a digital play back device.

3. The method of claim 1, said method further comprising:
   before said sending the notification of the pending deletion event of deleting the recording, said processor receiving a selection, from the first user, of the notification method.

4. The method of claim 1, said method further comprising:
   said processor delaying the pending deletion event of deleting the recording by a specified magnitude of time delay.

5. The method of claim 1, wherein the method further comprising:
   said processor marking the recording to be saved until storage space used to store the recording is needed by a new recording;
   after said marking, said processor scheduling the new recording;
   after said scheduling, said processor ascertaining that additional space is needed to store the new recording; and
   in response to said ascertaining, said processor deleting the recording to provide the additional space needed to store the new recording.

6. The method of claim 1, said method further comprising:
   after said configuring the plurality of notification options and before said sending the notification of the pending deletion event of deleting the recording to the first user, said processor checking the plurality of notification options at a specified time before the pending deletion event of deleting the recording to determine whether the notification of the pending deletion event of deleting the recording can be sent to the first user.

7. The method of claim 3, wherein the notification method selected by the first user is selected from the group consisting of electronic mail, SMS (Short Message Service), phone, instant message, and pager.

8. The method of claim 1, said method further comprising:
   after said sending to the first user the notification of the pending deletion event, said processor receiving from the first user an instruction to delete the recording, which satisfies a necessary condition for deleting the recording.

9. A computer system comprising a processor, a memory coupled to the processor, and a computer readable hardware storage device coupled to the processor, said storage device containing program code configured to be executed by the processor via the memory to implement a method for early notification of a pending deletion event by a digital play back device, said method comprising:
   said processor configuring a plurality of notification options maintained with respect to a user profile associated with a first user, said configuring the plurality of notification options comprising (i) configuring a notification interval between successive notifications to the first user of the pending deletion event of deleting the recording and (ii) configuring a notification to the first user of the pending deletion event of deleting the recording that was recorded by another user and was not selected to be recorded by the first user; and
   said processor sending, to the first user via a notification method, the notification of the pending deletion event of deleting the recording.

10. The computer system of claim 9, said method further comprising:
    before said configuring the plurality of notification options, said processor scheduling the recording by a digital play back device.

11. The computer system of claim 9, said method further comprising:
    before said sending the notification of the pending deletion event of deleting the recording, said processor receiving a selection, from the first user, of the notification method.

12. The computer system of claim 9, said method further comprising:
    said processor delaying the pending deletion event of deleting the recording by a specified magnitude of time delay.

13. The computer system of claim 9, wherein the method further comprising:
    said processor marking the recording to be saved until storage space used to store the recording is needed by a new recording;
    after said marking, said processor scheduling the new recording;
    after said scheduling, said processor ascertaining that additional space is needed to store the new recording; and
    in response to said ascertaining, said processor deleting the recording to provide the additional space needed to store the new recording.

14. The computer system of claim 9, said method further comprising:
    after said sending to the first user the notification of the pending deletion event, said processor receiving from the first user an instruction to delete the recording, which satisfies a necessary condition for deleting the recording.

15. A computer readable hardware storage device comprising computer readable program code stored therein, said program code containing instructions configured to be executed by a processor of a computer system to implement a method for early notification of a pending deletion event by a digital play back device, said method comprising:
    said processor configuring a plurality of notification options maintained with respect to a user profile associated with a first user, said configuring the plurality of notification options comprising (i) configuring a notification interval between successive notifications to the first user of the pending deletion event of deleting the recording and (ii) configuring a notification to the first user of the pending deletion event of deleting the recording that was recorded by another user and was not selected to be recorded by the first user; and said processor sending, to the first user via a notification method, the notification of the pending deletion event of deleting the recording.

16. The storage device of claim 15, said method further comprising:

before said configuring the plurality of notification options, said processor scheduling the recording by a digital play back device.

17. The storage device of claim 15, said method further comprising:

before said sending the notification of the pending deletion event of deleting the recording, said processor receiving a selection, from the first user, of the notification method.

18. The storage device of claim 15, said method further comprising:

said processor delaying the pending deletion event of deleting the recording by a specified magnitude of time delay.

19. The storage device of claim 15, wherein the method further comprising:

said processor marking the recording to be saved until storage space used to store the recording is needed by a new recording;

after said marking, said processor scheduling the new recording;

after said scheduling, said processor ascertaining that additional space is needed to store the new recording; and in response to said ascertaining, said processor deleting the recording to provide the additional space needed to store the new recording.

20. The storage device of claim 15, said method further comprising:

after said sending to the first user the notification of the pending deletion event, said processor receiving from the first user an instruction to delete the recording, which satisfies a necessary condition for deleting the recording.

\* \* \* \* \*